United States Patent
Venkataraghavan et al.

(10) Patent No.: US 11,945,401 B2
(45) Date of Patent: Apr. 2, 2024

(54) DETECTING SENSOR MALFUNCTION OR TAMPERING BASED ON REDUCTANT CONSUMPTION

(71) Applicant: Caterpillar Inc., Peoria, IL (US)

(72) Inventors: Jay Venkataraghavan, Dunlap, IL (US); Baoyong Liu, San Antonio, TX (US); Urvish Joshi, Dunlap, IL (US); Kevin Lloyd Dea, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/657,589

(22) Filed: Mar. 31, 2022

(65) Prior Publication Data

US 2023/0311808 A1    Oct. 5, 2023

(51) Int. Cl.
  *B60R 25/10*   (2013.01)
  *G07C 5/08*    (2006.01)
  *G08B 29/04*   (2006.01)

(52) U.S. Cl.
  CPC .......... *B60R 25/101* (2013.01); *G07C 5/0816* (2013.01); *G08B 29/046* (2013.01)

(58) Field of Classification Search
  CPC .......................... G07C 5/0816; G08B 29/046
  See application file for complete search history.

(56) References Cited

U.S. PATENT DOCUMENTS

| | | | |
|---|---|---|---|
| 8,806,853 B2* | 8/2014 | Johnson | F01N 3/18 60/274 |
| 9,170,144 B2* | 10/2015 | Qi | G01N 27/123 |
| 9,297,686 B1* | 3/2016 | Ross, Jr. | G01F 23/263 |
| 9,382,828 B2* | 7/2016 | Wei | F01N 11/00 |
| 9,626,812 B2* | 4/2017 | See | F01N 3/208 |
| 9,957,864 B2* | 5/2018 | Johnson | F01N 3/2073 |
| 10,077,698 B2 | 9/2018 | Nihongi et al. | |

(Continued)

FOREIGN PATENT DOCUMENTS

| | | |
|---|---|---|
| DE | 102013104752 B4 | 12/2021 |
| EP | 1860294 | 11/2007 |

(Continued)

OTHER PUBLICATIONS

European Extended Search Report for Europe Patent Appln. No. 23159529.9, dated May 19, 2023 (7 pgs).

*Primary Examiner* — Hoi C Lau
(74) *Attorney, Agent, or Firm* — Bookoff McAndrews, PLLC (57) ABSTRACT

A systems for detecting level sensor malfunction or tampering based on reductant consumption and determining when to initiate a quality check of reductant used in an aftertreatment system are disclosed. The system comprises a memory storing instructions and a processor executing the instructions to perform a process including: receiving dosing data associated with an amount of DEF supplied to the aftertreatment system; receiving tank level data from a level sensor in a DEF tank; comparing the dosing data with the tank level data; and based on the comparison: initiating, by the one or more processors, a quality check; and/or determining, by the one or more processors, a possible error requiring further diagnostics; and causing to present, by the one or more processors, an indication that the quality check is being initiated and/or that a possible error requires further diagnostics on a display.

19 Claims, 6 Drawing Sheets

(56) References Cited

U.S. PATENT DOCUMENTS

| | | | |
|---|---|---|---|
| 10,094,264 B2* | 10/2018 | Khaled | F01N 11/00 |
| 10,196,955 B2* | 2/2019 | Wei | F01N 3/208 |
| 10,927,741 B2* | 2/2021 | Wei | F01N 3/10 |
| 2012/0118059 A1* | 5/2012 | Reimer | G01N 29/024 |
| | | | 73/290 V |
| 2014/0033683 A1* | 2/2014 | Wei | F01N 11/00 |
| | | | 60/274 |
| 2014/0150405 A1* | 6/2014 | Johnson | F01N 3/2073 |
| | | | 60/274 |
| 2014/0318104 A1* | 10/2014 | Johnson | F01N 3/18 |
| | | | 60/274 |
| 2015/0013646 A1* | 1/2015 | Qi | G01F 23/246 |
| | | | 73/304 C |
| 2015/0088362 A1* | 3/2015 | See | F01N 11/00 |
| | | | 701/33.9 |
| 2015/0096285 A1* | 4/2015 | Andrews | F01N 11/00 |
| | | | 60/286 |
| 2015/0218990 A1* | 8/2015 | Hudgens | F01N 3/2066 |
| | | | 422/111 |
| 2016/0040580 A1* | 2/2016 | Khaled | F02B 77/083 |
| | | | 60/277 |
| 2016/0222859 A1* | 8/2016 | Hogan | F01N 11/00 |
| 2016/0281569 A1* | 9/2016 | Wei | F01N 11/00 |
| 2019/0049341 A1* | 2/2019 | Singh | F01N 11/007 |
| 2019/0178133 A1* | 6/2019 | Wei | F01N 3/208 |
| 2019/0234271 A1* | 8/2019 | Volmerding | F01N 3/208 |
| 2022/0356826 A1* | 11/2022 | Dea | F01N 3/2066 |

FOREIGN PATENT DOCUMENTS

| | | |
|---|---|---|
| EP | 2 840 240 B1 | 10/2016 |
| IN | 201741030814 A | 3/2019 |
| IN | 201941021455 A | 4/2020 |

* cited by examiner

DETECTING SENSOR MALFUNCTION OR TAMPERING BASED ON REDUCTANT CONSUMPTION

TECHNICAL FIELD

The present disclosure relates generally to internal combustion engine systems, and more particularly, to detecting reductant (e.g., Diesel Exhaust Fluid) fill sensor malfunction or tampering based on reductant consumption in an aftertreatment system.

BACKGROUND

Internal combustion engines are useful in various applications, including mobile machines and power generation. Internal combustion engines are commonly used in conjunction with one or more aftertreatment devices that receive exhaust from the engine and reduce an amount of undesired emissions such as nitrogen oxides (NOx). One exemplary aftertreatment device is a Selective Catalytic Reduction (SCR) device or SCR catalyst. SCR catalysts may react with NOx to produce nitrogen and water. However, this reaction also requires the presence of a reductant in the SCR catalyst. A storage system may be provided in communication with an aftertreatment system to supply a reductant-containing fluid, which may be referred to as diesel exhaust fluid (DEF), to the SCR catalyst. This fluid may contain urea that, when heated, produces a reductant (ammonia) that allows the SCR catalyst to react with NOx. The ability to accurately and reliably measure DEF levels in the supply is essential in order to maintain an acceptable and adequate quantity of supply in the aftertreatment system.

The DEF level in the storage system of an aftertreatment device is typically measured by using one or more level sensors (e.g. float or fill sensors) in the storage system. However, these fill sensors are typically prone to malfunction due to design variations of the storage systems and/or mechanical or electrical failures. For example, a fill sensor may not accurately measure DEF level where there is a failed electrical or mechanical connection, or where the fill sensor is physically stuck at an incorrect level during the operation of the emissions aftertreatment system. Further, fill sensors are also prone to tampering by a user, for example, the sensor may be modified or moved by an engine operator to a "full tank" level so that the sensor permanently detects a "full tank level" even when the DEF level in the storage system is depleted. In some cases, a user may insert water (or some other fluid) instead of DEF, such that a "full tank" level is read by the fill sensor even when the DEF in the storage tank or system has been incorrectly or improperly diluted. External environmental factors may also prevent fill sensors from reliably measuring DEF level, for example, if the fill sensors are frozen.

An exemplary device for detecting a remaining amount of liquid is disclosed in European Patent Publication No. 2,840,240 B2 (the '240 reference) to Ota. The '240 reference recites an engine equipped with a tank that stores urea water, a level sensor that detects an amount of urea water remaining in a tank, and a urea injection valve that injects urea water in the tank into an exhaust passage. The '240 reference further recites that a control device determines whether misdetection is made in the level sensor on the basis of a first urea remaining amount detected by the level sensor immediately after the engine has stopped, and an integrated value for the urea water supply amount, and a second urea remaining amount detected by the level sensor after the supplying of urea water has begun. The '240 reference additionally recites that when the control device determines that misdetection is made in the level sensor, the control device sets, as the estimated value for the amount of urea in the tank, the value obtained by subtracting the integrated value for the urea water supply amount from the first urea remaining amount. While the device described in the '240 reference may be useful in some circumstances, it does not disclose at least initiating a quality check and presenting an indication that the quality check is being initiated on a display after comparing tank level data and dosing data.

The disclosed method and system for detecting sensor malfunction or tampering based on reductant consumption and/or determining when to initiate a quality check of DEF used in an aftertreatment system may solve one or more of the problems set forth above and/or other problems in the art. The scope of the current disclosure, however, is defined by the attached claims, and not by the ability to solve any specific problem.

SUMMARY

In one aspect, a method for detecting level sensor malfunction or tampering based on reductant consumption in an aftertreatment system is disclosed. The method may comprise: receiving, at one or more processors, dosing data associated with an amount of DEF supplied to the aftertreatment system; receiving, by the one or more processors, tank level data from a level sensor in a DEF tank; comparing, by the one or more processors, the dosing data with the tank level data; and based on the comparison: initiating, by the one or more processors, a quality check; and/or determining, by the one or more processors, a possible error requiring further diagnostics; and causing to present, by the one or more processors, an indication that the quality check is being initiated and/or that a possible error requires further diagnostics on a display.

In another aspect, a system for determining when to initiate a quality check of DEF used in an aftertreatment system is disclosed. The system may comprise a memory storing instructions; and a processor executing the instructions to perform a process including: receiving dosing data associated with an amount of DEF supplied to the aftertreatment system; receiving tank level data from a level sensor in a DEF tank; comparing the dosing data with the tank level data; and based on the comparison: initiating a quality check; and causing to present an indication that the quality check is being initiated on a display.

In yet another aspect, a non-transitory computer-readable medium is disclosed. The non-transitory computer-readable medium may store instructions that, when executed by a processor, cause the processor to perform a method for detecting level sensor malfunction or tampering based on reductant consumption in an aftertreatment system, the method comprising: receiving dosing data associated with an amount of DEF supplied to the aftertreatment system; receiving tank level data from a level sensor in a DEF tank; comparing the dosing data with the tank level data; and based on the comparison: initiating a virtual DEF quality detection check; and causing to present an indication that the virtual DEF quality detection check is being initiated on a display.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value. Further, terms such as "reagent," "diesel engine fluid," "DEF", "reductant," and the like, are intended to cover any fluid or chemical stored and used as part of an aftertreatment system for an engine.

Figure 1:
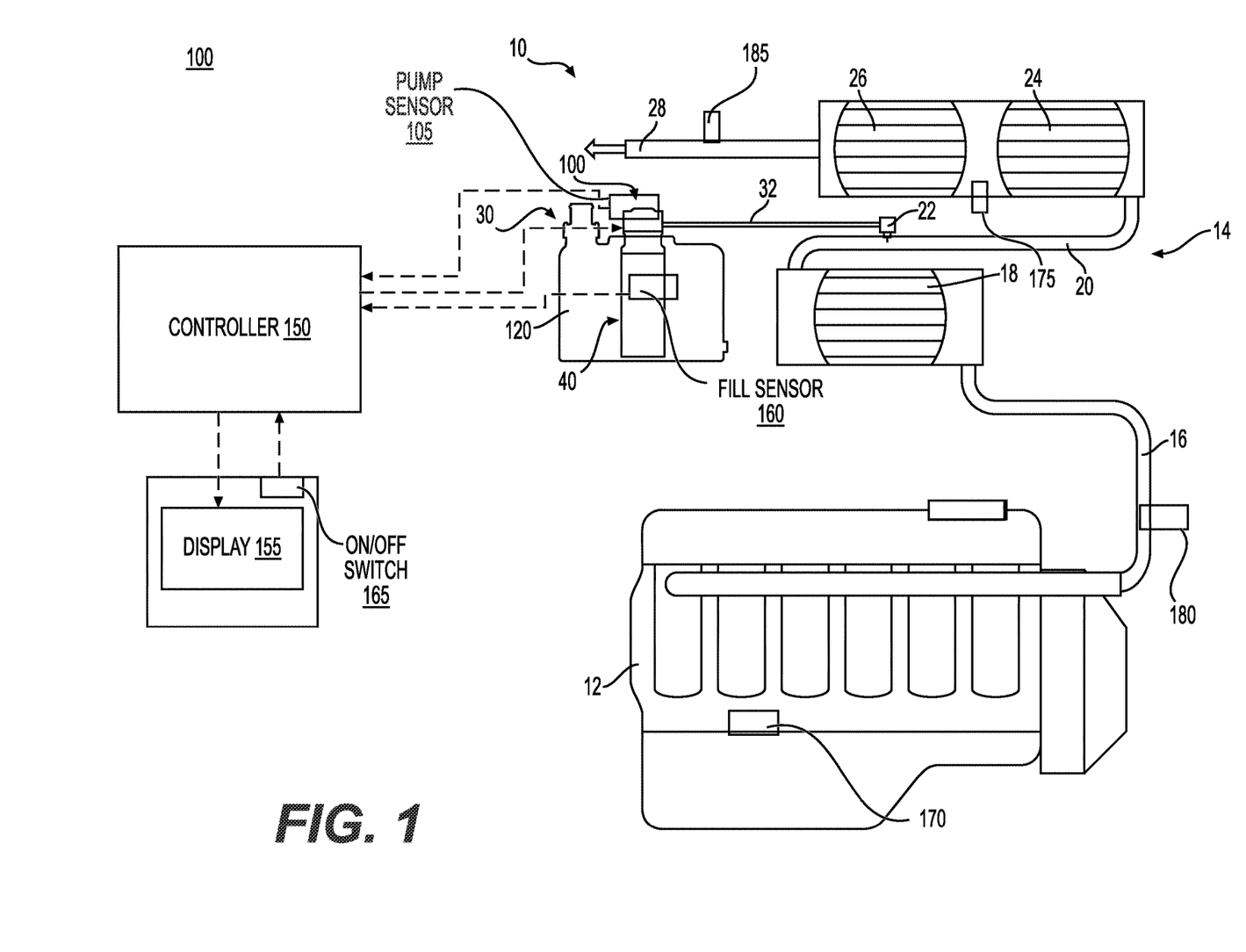
FIG. 1 is a schematic diagram illustrating an internal combustion engine system according to aspects of the present disclosure.

FIG. 1 illustrates an internal combustion engine system 10 that may include an engine 12 (e.g., an internal combustion engine), an aftertreatment system 14 (e.g., an exhaust aftertreatment system) that receives and treats exhaust from engine 12, a controller 150, and a display 155. While engine 12 may be a diesel internal combustion engine, any suitable combustion engine for combusting liquid fuel (e.g., gasoline, diesel, etc.) or gaseous (e.g., natural gas) fuel may employed as engine 12. Aftertreatment system 14 may include one or more aftertreatment devices 18, 24, 26 and a storage system 30 (e.g., a storage system for reductant such as diesel exhaust fluid (DEF)). Exemplary aftertreatment devices 18, 24, 26 include diesel oxidation catalysts, particulate filters, and selective catalytic reduction (SCR) catalysts. First aftertreatment device 18 may be connected downstream of engine 12 via a first exhaust passage 16. Second and third aftertreatment devices 24, 26 may be in fluid communication with, and downstream of, first aftertreatment device 18 via a second exhaust passage 20. A third exhaust passage 28 may extend downstream of second and third aftertreatment devices 24, 26, and may include one or more suitable passages for guiding treated exhaust gas to an outlet. The first, second, and third aftertreatment devices 18, 24, 26 may be connected in series with respect to a path of exhaust produced by engine 12.

First aftertreatment device 18 of aftertreatment system 14 may include a particulate filter and may be connected to engine 12 via first exhaust passage 16. However, first aftertreatment device 18 may include a diesel oxidation catalyst instead of, or in addition to, a particulate filter. A second exhaust passage 20 may be provided downstream of first aftertreatment device 18 and may extend to one or more additional aftertreatment devices, such as second aftertreatment device 24 and third aftertreatment device 26. Second aftertreatment device 24 may include an SCR catalyst. Third aftertreatment device 26 may include an oxidation catalyst such as an ammonia oxidation catalyst, or another suitable aftertreatment device. Third aftertreatment device 26 may be provided in a common housing with second aftertreatment device 24, as shown in FIG. 1, or may be provided in a separate housing.

Storage system 30 may form a containment, filtering, and heating device for reductant that includes a storage container 120, a header 100, and a filter assembly 40. Storage container 120 may be any suitable containment device that forms a reservoir for reductant. As used herein, the reductant (also known as a diesel exhaust fluid (DEF)) may include urea or any other appropriate fluid. Filter assembly 40 may extend within storage container 120 and may provide a seal at an upper opening of storage container 120, as described below. Storage system 30 may be connected to second exhaust passage 20 via a reductant injector 22 (e.g., DEF injector) and a reductant (DEF) supply passage 32. Reductant injector 22 may be provided at a distal end of reductant supply passage 32 and secured to second exhaust passage 20. One or more reductant pumps (not shown) may be provided in header 100 or reductant supply passage 32 to pump reductant from storage system 30 to reductant injector 22. The header 100 may be removably fixed to the storage container 120 and may include one or more components extending within the storage system 30. For example, header 100 may include components to monitor, heat, pump, and outlet reductant (e.g., DEF). For example, header 100 may include a pump sensor 105 that may collect or measure dosing data, for example DEF dosing data 237, associated with an amount of DEF supplied by the aftertreatment system 14 to the exhaust.

The internal combustion engine system 10 may further have sensors for detecting one or more parameters of the internal combustion engine system 10. For example, the internal combustion engine system 10 may have a pump sensor 105, a fill sensor 160, mass flow sensors 170, an NOx sensor 180, an SCR inlet temperature sensor 175 and/or a tailpipe NOx sensor 185. The mass flow sensors 170 may be located within engine 12, and may measure parameters associated with calculating a mass flow including, for example, engine speed, density, fuel, and so forth. The NOx sensor may be a sensor that measures nitrogen oxide (NOx) levels in the exhaust of engine 12, and may be located at an exhaust of the engine 12 prior to the exhaust being treated by the first aftertreatment device 18. NOx may include nitric oxides, nitrogen dioxide, and other gasses that may be emitted in the exhaust of engine 12. Similarly, a tailpipe NOx sensor 185 may measure NOx levels in the tailpipe of the internal combustion engine system 10, e.g., after the exhaust of engine 12 has been treated by the aftertreatment system 14. The SCR inlet temperature sensor 175 may measure the temperature of the exhaust received from engine 12 prior to the exhaust being treated by the aftertreatment system 14. The internal combustion engine system 10 may also have a virtual or physical DEF quality check sensor (not shown) for generating quality check data, for example, DEF quality check data 216. The DEF quality check data 216 may also include data indicating that a DEF quality check process is running (e.g., currently conducting a measurement of DEF quality of the internal combustion engine system 10).

The fill sensor 160 (e.g., level or float sensor) may be used to calculate the amount of reductant (e.g. DEF) in the storage container 120. While the fill sensor 160 is shown in FIG. 1 as a single sensor, multiple float or fill sensors may be used to measure fill levels to provide data as provided further below with respect to FIGS. 2-5. The fill sensor 160 may provide level data, for example DEF tank level data 231, indicating an amount of reductant or DEF in the storage system 30. The fill sensor 160 may also provide other data pertaining to the fill sensor 160, such as DEF fill sensor status data 215. The DEF float sensor data may include information regarding the functioning of the device, for example, an indication that the device has mechanically or electrically failed or is not receiving power. In some embodiments, the DEF tank level data 231 transmitted by fill sensor 160 to the controller 150 may include DEF fill sensor status data 215.

The internal combustion further have a controller 150 configured to receive data from one or more sensors associated with the internal combustion engine system 10 as well as transmit data to one or more devices associated with the internal combustion engine system 10. The controller 150 may include at least one memory device storing instructions to perform various control functions and processes; at least one processor executing the instructions from memory device to perform a set of desired operations; and a communication interface facilitating the communication between various system components. The instructions may be non-transitory computer-readable instructions for executing a control application. A communication interface of the controller 150 may enable the controller 150 to communicate with the display 155 and a network interface (not shown). Accordingly, controller 150 may be configured to generate and return a GUI on display 155 according to, for example, the processes associated with FIGS. 2-5. Controller 150 may also include a wide variety of components or subsystems such as, processors, cache memory, memory controller, graphics controllers, network adapters, data processing devices, etc. In addition to performing logic, mathematical and other operations on data, the controller 150 may be configured to communicate or transfer data to and from the display 155, the network interface, sensors associated with the internal combustion engine system 10, and so forth. Although embodiments herein may be discussed as being performed by controller 150, various steps may be performed partially or entirely by other components, controllers, processors, devices, servers etc.

The controller 150 may, through a network interface, may be communicably connected to one or more machines directly, or via a network 125, such as 3G/4G/5G wireless networks, a local area network (LAN), a wide area network (WAN), a private data network, a virtual private network (VPN), and/or a public data network, such as the Internet. The network interface of the controller 150 may include any appropriate type of network device capable of communicating with other computer systems based on one or more wired or wireless communication protocols. The network interface of the controller 150 may be configured to send data to and receive data from the internal combustion engine system 10 or from other systems or sensors.

The controller 150 may receive data from one or more of pump sensor 105, mass flow sensors 170, NOx sensor 180, SCR inlet temperature sensor 175, fill sensor 160, ON/OFF switch 165, tailpipe NOx sensor 185, the virtual or physical DEF quality check sensor (not shown), and/or other sensors or systems associated with the internal combustion engine system 10. As explained in further detail below with respect to FIGS. 2-6, the controller 150 may use this data to conduct a primary check and/or a secondary check in order to determine if the fill sensor 160 has been tampered with or has failed, and upon determining that the fill sensor 160 has failed, initiating (or sensing instructions to initiate) a DEF quality check process. The controller 150 may further be configured to transmit commands or messages to one or more devices associated with the internal combustion engine system 10 as explained further below with respect to FIGS. 2-5. For example, the controller 150, upon determining that a primary check or a secondary check has failed as explained further below, may transmit an indication of the failure to the display 155.

The controller 150 may further be connected with a display 155 of the internal combustion engine system 10, including an ON/OFF switch 165 (e.g. a key on-off switch) used to turn the engine 12 on and off. The display 155 may include any device capable of visual or tactile presentation of data and images in a form intelligible to a user. In some embodiments, the display 155 may present information dynamically in a visual medium. In some other embodiments, the display 155 may support a tactile display (display that may be felt by the fingers—and intended for the visually impaired) of data and images. In some embodiments, the display 155 supporting a tactile display may further be audio-enabled, such that parameter elements are associated with one or more sounds (e.g. musical tones, filtered noises, recorded sound effects, synthesized speech, and the like), in order to further assist a visually impaired user utilizing the display. Non-limiting examples of the display 155 may include a cathode ray tube, a liquid crystal display, a light emitting display, a plasma display, etc. In some embodiments, the display 155 may also accept input. In these embodiments, the display 155 may include a touch screen where information may be entered by selecting one of multiple options presented on the display. Selecting an option may be accomplished using a mouse (as is well known in the art), or touching an area of the display. In some embodiments, display 155 may comprise two or more displays in communication with controller 150.

Figure 2:
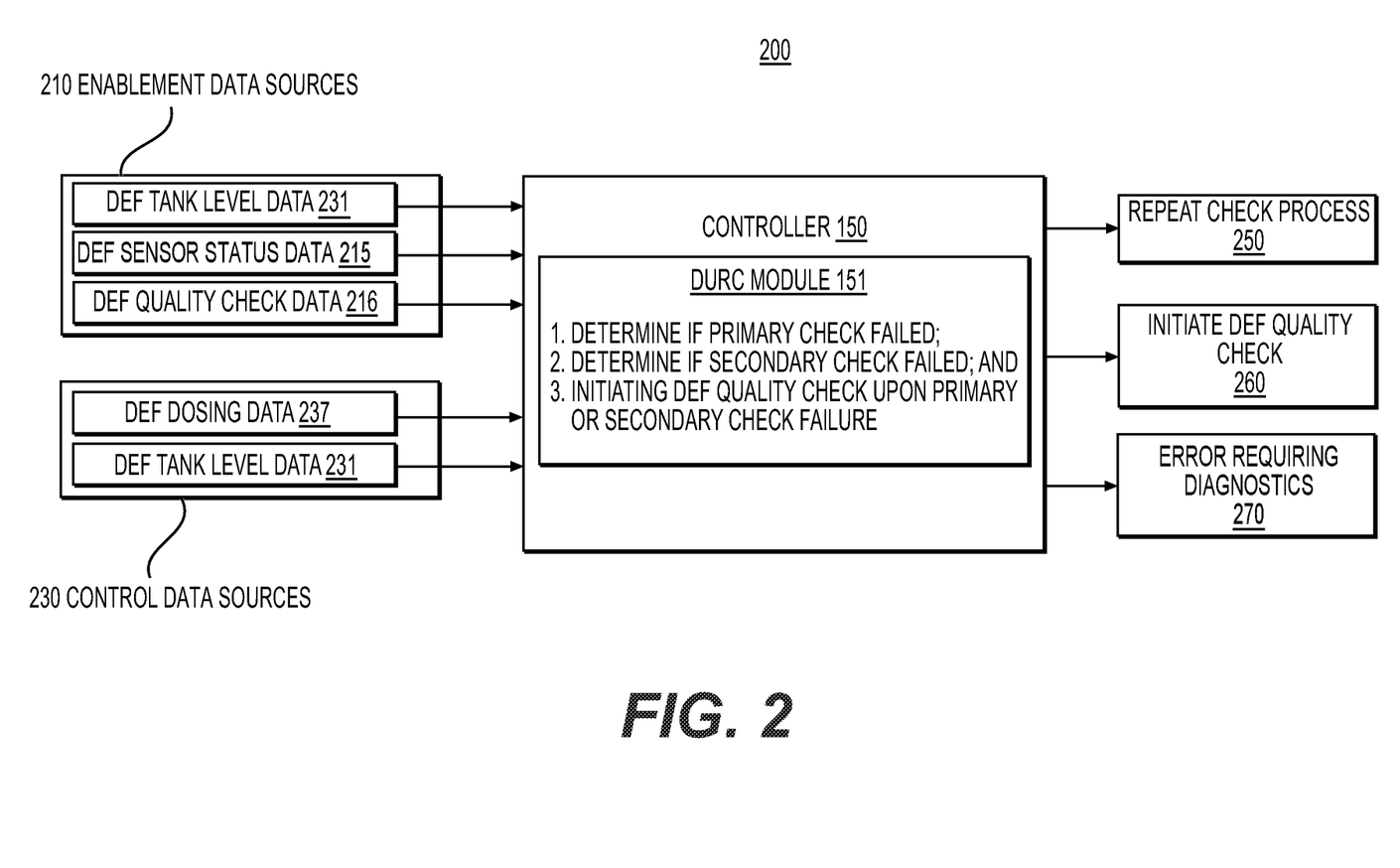
FIG. 2 is a block diagram illustrating a configuration for estimating quality of reductant in an engine aftertreatment system, according to one or more aspects of the present disclosure.

FIG. 2 depicts a block diagram 200 illustrating the process for initiating a DEF use rationality check (DURC), according to one or more aspects of the present disclosure. The block diagram 200 includes enablement data sources 210, control data sources 230, controller 150, a DURC module 151, a repeat check process 250, an initiate a DEF quality check 260, and a possible error requiring further diagnostics 270. Enablement data sources 210 may be sources monitored by the controller 150 in order to determine whether to initiate a DURC to determine whether the internal combustion engine system 10 has failed a primary or secondary check. For example, DEF tank level data 231 may be obtained from fill sensor 160 described above with respect to FIG. 1.

As explained further below with respect to FIGS. 3-5, the controller may initiate a DURC upon determining that one or more enablement conditions has been met. For example, the controller 150 may initiate DURC module 151 upon receiving an indication of a change in level of DEF (e.g., a DEF refill) in the storage container 120 based on the DEF tank level data 231 received from fill sensor 160 or another sensor or component associated with the internal combustion engine system 10. According to some aspects, if no DEF refill is detected, then the controller 150 may refrain from initiating the DURC module 151. The controller 150 may also receive DEF fill sensor status data 215 from the fill sensor 160 or another sensor associated with the internal combustion engine system 10. For example, in some embodiments, upon determining that there is a mechanical or electrical failure of the fill sensor 160 based on the DEF fill sensor status data 215, the controller 150 may initiate the DURC module 151 and begin making determinations as described further below with respect to FIGS. 3-5. DEF fill sensor status data 215 may in some embodiments be generated by diagnostics or other equipment associated with the fill sensor 160 for detecting mechanical or electrical failures with the fill sensor 160. While the DEF fill sensor status data 215 in some cases may include an affirmative signal indicating a failure, in other cases the absence of certain data or information (e.g., no signal from the fill sensor 160) may also indicate an electrical or mechanical failure. In some embodiments, the DEF tank level data 231 may also include DEF fill sensor status data 215 and be received from the fill sensor 160. According to some aspects, DEF tank level data 231 may also include previously stored values from prior operations of the controller 150 or DURC module 151 described herein.

The controller 150 may further receive DEF quality check data 216 from another device. For example the DEF quality check data 216 may be obtained from a process or system that determines whether a DEF quality check is currently being performed, for example, whether a virtual or physical sensor is already analyzing DEF quality. Upon receiving DEF quality check data 216 indicating that a DEF quality check is currently being performed or in progress, the controller 150 may refrain from initiating DURC module 151. In some embodiments, multiple enablement conditions may be implemented. For example, the controller 150 in some embodiments may only implement the DURC module 151 upon determining that there is a DEF fill event based on DEF tank level data 231, that the sensors have not failed based on DEF fill sensor status data 215, and that there is no DEF quality check in progress based on DEF quality check data 216. Once these enablement conditions are met, the DURC module 151 may then perform a process as described further below with respect to FIGS. 3-5 for determining whether primary and secondary checks have failed and initiating a DEF quality check 260 for the internal combustion engine system 10. In this manner, a DEF quality check for measuring performance of the aftertreatment system 14 may be implemented in response to a potential sensor failure. The DEF quality check 260 may then be used to determine whether the aftertreatment system 14 is operating to appropriate standards. Other enablement conditions are also contemplated. For example, an enablement condition may be an amount of DEF supplied to the aftertreatment system, and the enablement data source may be data obtained from a pump sensor 105.

The block diagram 200 further illustrates control data sources 230. Control data sources 230 may be used by the controller 150 to determine whether or not to initiate a DEF quality check 260 for the internal combustion engine system 10. For example, DEF dosing data 237 may be received from one or more DEF pump sensors associated with the internal combustion engine system 10, for example, pump sensor 105. The controller may further receive DEF tank level data 231 from one or more float or fill sensors associated with the internal combustion engine system 10, for example, the fill sensor 160. The controller 150 may then use DURC module 151, based on data obtained from the control data sources 230, to either repeat check process 250 or initiate a DEF quality check 260 as described further below with respect to FIGS. 3-5. According to some aspects, alternatively or in addition to initiating a DEF quality check as described above, the controller 150 may determine that a possible error requires further diagnostics other than initiating a DEF quality check (e.g. error requiring further diagnostics 270). For example, further diagnostics may include reviewing or analyzing various components or sensors associated with the internal combustion engine system 10 for possible errors or issues.

Figure 3:
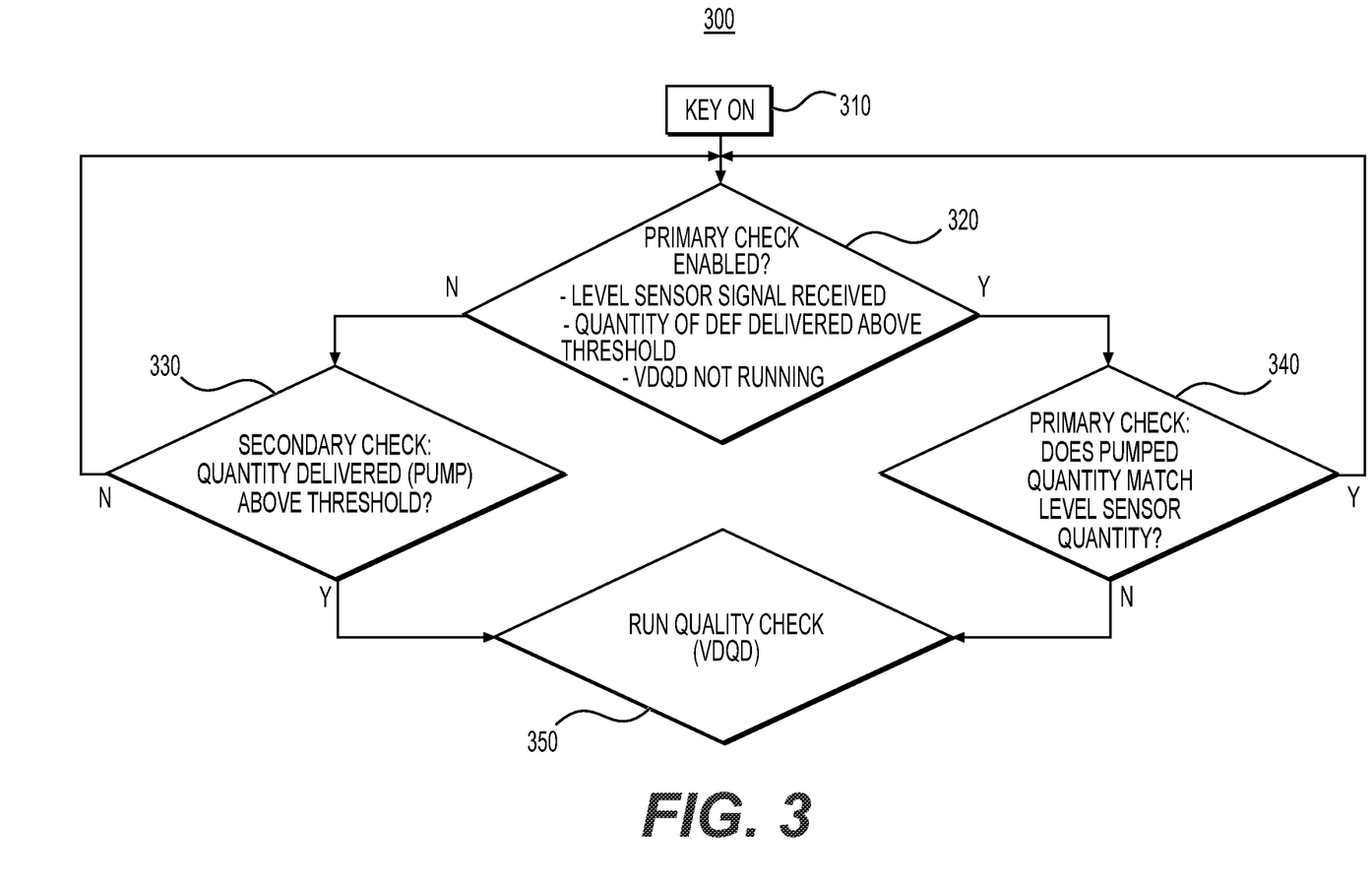
FIG. 3 is a flowchart of an exemplary method of determining when to initiate a quality check of DEF used in an aftertreatment system, according to one or more aspects of the present disclosure.

FIG. 3 illustrates an exemplary method of determining when to initiate a quality check of DEF used in an aftertreatment system, e.g., by utilizing a DURC module 151 according to one or more aspects discussed above. A quality check of DEF may be for example, a virtual DEF quality detection (VDQD) check wherein the quality of DEF may be determined using one or more NOx sensors associated with the internal combustion engine system 10. At step 310 of a method 300, the internal combustion engine system 10 may be powered on or keyed on via an on/off switch associated with a display 155 and in communication with controller 150. At step 320, the controller 150 may determine whether to enable a primary check of the DURC module 151 as explained above with respect to FIG. 2. For example, the controller 150 may initiate a primary check upon determining that a level (e.g., float or fill) sensor signal is received (e.g. no mechanical or electrical fill sensor failure), that a quantity of DEF delivered by a pump is above a specific threshold, and that the VDQD or DEF quality check process is not running or currently in progress. Upon determining that the primary check is enabled at step 320, the controller 150 may then at step 340, via DURC module 151, determine whether the primary check has failed by determining whether the pump quantity matches the level sensor quality, as explained further below with respect to FIGS. 4 and 5. For example, the controller 150 may compare DEF tank level data from a level sensor in the DEF tank with dosing data associated with an amount of DEF supplied to the aftertreatment system. As explained above, DEF tank level data 231 may be obtained from the fill sensor 160, and DEF dosing data 237 may be obtained from the pump sensor 105. The DEF tank level data 231 and the DEF dosing data 237 may then be compared. In some embodiments, if the difference in the amount of DEF pumped and the change in level of the DEF tank exceeds a predetermined threshold (e.g., a pumped quantity does not match a sensor quantity), the controller 150 may determine that the primary check is failed. According to some aspects, if one of the enablement conditions described at step 320 above are not met while the primary check at step 340, the secondary check may automatically be enabled at step 330. Upon determining that the primary check has failed, the controller may initiate a DEF quality check (e.g., VDQD) at step 350. If the primary check is not failed (e.g. a pumped quantity matches a sensor quantity), the process is then repeated. At step 320, if the controller determines that a primary check is not enabled (e.g., a sensor has failed or the quantity of DEF does not exceed a threshold), the controller 150 may initiate a secondary check at step 330. At step 330, the secondary check may comprise determining whether the amount of DEF pumped (e.g., DEF dosing data 237) exceeds a predetermined threshold. Upon determining that the secondary check has failed, e.g. an insufficient amount of DEF has been detected by pump sensor 105, the controller 150 may proceed to initiate a DEF quality check at step 350. If the secondary check does not fail at step 330, the process returns to step 320 and repeats. In this manner, the performance of level sensors may be monitored, and a DEF quality check may be initiated once conditions are met (for example, conditions indicating a failure, malfunction, or tampering of the level sensors).

Furthermore, according to aspects of the disclosure, by using the DURC module 151, performance and/or tampering may be detected even where the fill sensor 160 does not detect any change in level of DEF in the storage system 30, for example, where a fill sensor 160 is frozen or stuck in place during operation of the internal combustion engine system 10. Furthermore, according to aspects of the disclosures, fill sensor 160 may be calibrated to specific volumes or dimensions of storage system 30 in order to obtain more accurate DEF tank level data 231. According to further aspects, the controller 150 may be able to determine the type (or volume) of the storage system 30 based on the DEF tank level data 231. According to some aspects, by analyzing the change in level of the DEF over time in the storage system 30 and comparing that to performance based on the engine exhaust after treatment, the controller 150 of the DURC module 151 may be able to predict or determine the type of tampering or malfunction. For example, where the storage system 30 appears to be full, but the performance of the internal combustion engine system 10 does not meet expectations (as determined, for example, by a DEF quality sensor or by a virtual sensors such as VDQD as described herein), the controller 150 may determine that the DEF is improperly being diluted (e.g. with water). As another example, where the fill sensor 160 does not appear to change or move despite continuous operation, the controller may determine that there is tampering. For example, a "tampering" tank (e.g. a false storage system intended to deceive one or more systems of the internal combustion engine system 10), or by modification of the fill sensor to prevent it from accurately detecting DEF fill levels in the storage system 30.

According to aspects of the invention, different algorithms or methods may be used to compare the dosing data with tank level data as described above. For example, according to one aspect of this disclosure, a linear regression model may be used to determine if there is tampering or a sensor malfunction or failure. According to this aspect, both the storage system 30 tank level (e.g. DEF tank level data 231 as measured by the fill sensor 160) and the dosing data (e.g., DEF dosing data 237 as measured by pump sensor 105) may be plotted over time, for example, on an X-Y graph. In an ideal state, the change in volume of DEF over time corresponding to or indicated by the DEF tank level data 231 should be approximately equal to the change in volume of DEF over time corresponding to or indicated by DEF dosing data 237, in which case, according to the linear regression model, the R squared would be 1 (indicating that there is no variance between the volume of DEF pumped out and the volume of DEF measured in the tank). However, if there is tampering with the storage system 30, for example, the fill sensor 160 is zip tied or improperly secured to the top of the storage system 30 such that the fill sensor 160 always sends DEF tank level data 231 indicating a full tank, then when the DEF dosing data 237 indicates that a substantial volume (for example, 10 liters) of DEF has been pumped from the storage system 30 without any corresponding change in volume indicated by the DEF tank level data 231, the R square value may approach 0, indicating minimal or no correlation between the dosing data and tank level data, which may highly indicate or suggest tampering. According to some aspects, a threshold R squared value may be implemented to determine whether tampering has occurred, for example, an R squared value of 0.5, and accordingly, a VDQD quality check may be run as described above and further below.

Figure 4:
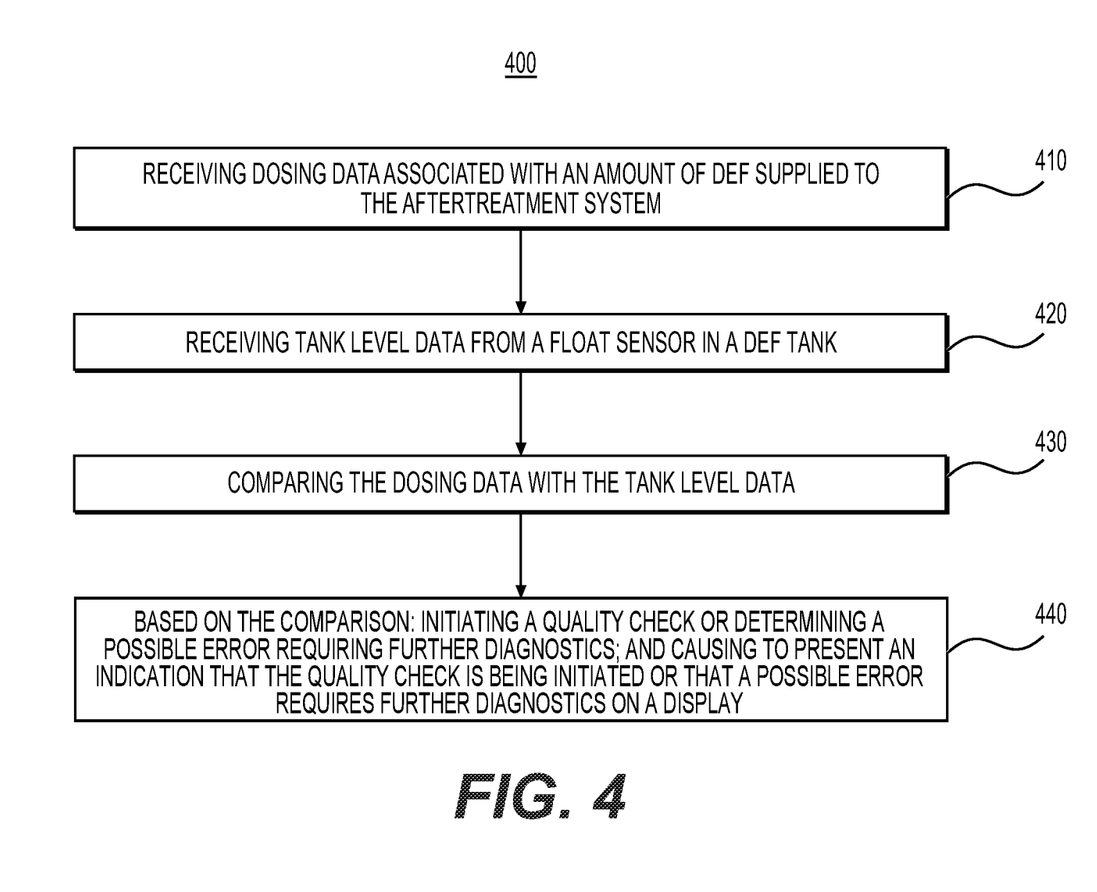
FIG. 4 is another flowchart of an exemplary method of determining when to initiate a quality check of DEF used in an aftertreatment system, according to one or more aspects of the present disclosure.

FIG. 4 depicts another flowchart of an exemplary method of determining when to initiate a quality check of DEF used in an aftertreatment system. At step 410 of the method 400, the controller 150 may receive dosing data associated with an amount of DEF supplied to the aftertreatment system 14 of the internal combustion engine system 10. The amount of DEF supplied may be an average amount of DEF supplied over time, or it may be a total amount following an engine start or key on. The dosing data may be received from a pump sensor 105 associated with the internal combustion engine system 10, which measures the amount of DEF that exits the storage container 120. At step 420, the controller 150 may receive tank level data from a level sensor (e.g. fill sensor 160) in storage container 120 (e.g., a DEF tank). The controller 150 may then compare the dosing data with the tank level data at step 430. Based on the comparison, at step 440, the controller 150 may initiate a DEF quality check (e.g. VDQD check) and then cause to present on a display an indicated that the quality check is being initiated on a display, for example, display 155 of FIG. 1. According to some aspects, alternatively or in addition to initiating a DEF quality check, the controller 150 may determine that a possible error requires further diagnostics other than initiating a DEF quality check. For example, further diagnostics may include reviewing or analyzing various components or sensors associated with the internal combustion engine system 10. According to some aspects, both the DEF quality check and further diagnostics together may be implemented.

Figure 5:
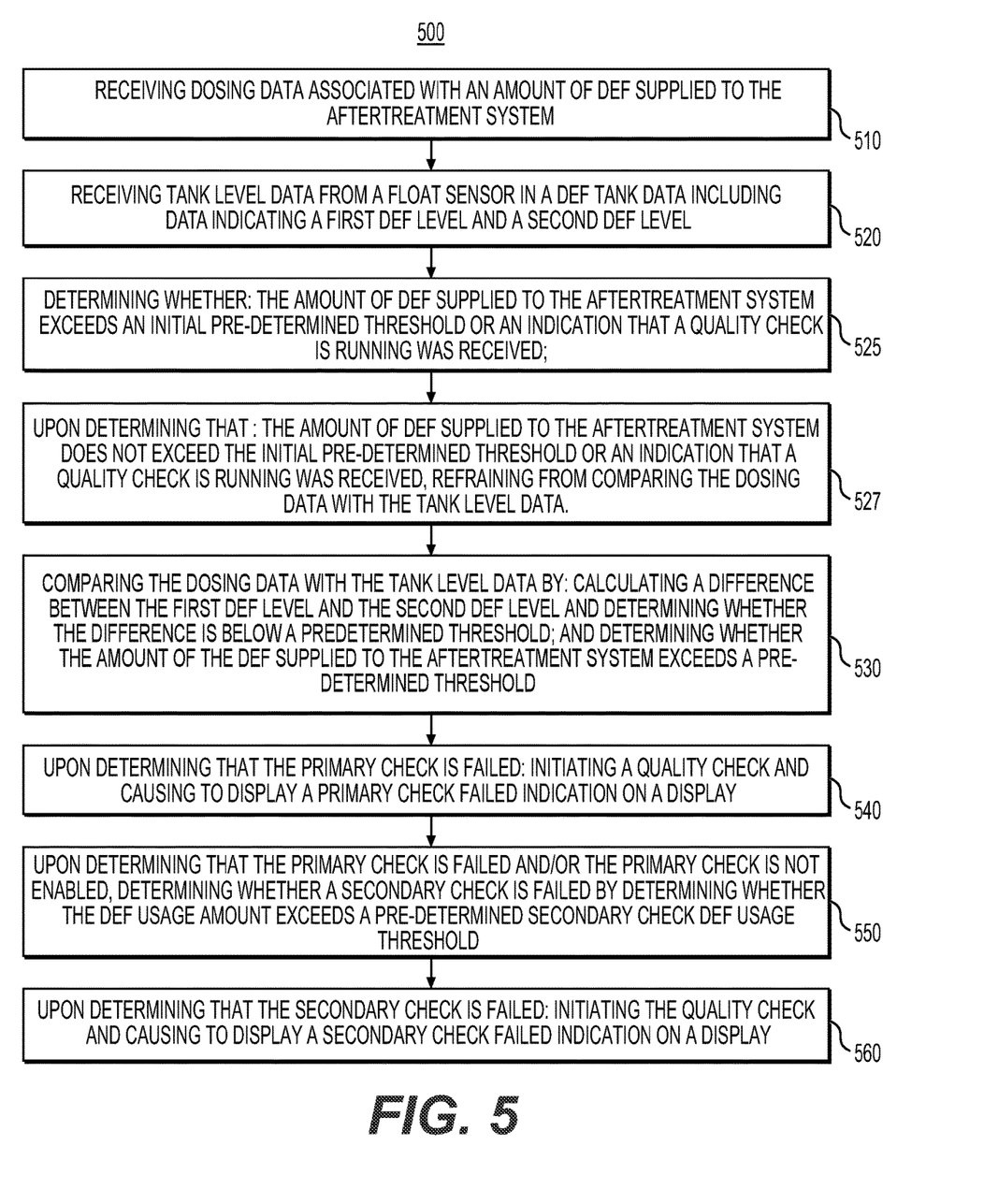
FIG. 5 is an additional flowchart of an exemplary method of determining when to initiate a quality check of DEF used in an aftertreatment system, according to one or more aspects of the present disclosure.

FIG. 5 depicts an additional flowchart of an exemplary method of determining when to initiate a quality check of DEF used in an aftertreatment system of an internal combustion engine system 10. At step 510 of the method 500, the controller 150 may receive dosing data associated with an amount of DEF supplied to the aftertreatment system. For example, as explained above, DEF dosing data 237 may be received from the pump sensor 105. The DEF dosing data 237 may include data indicating, for example, an amount of DEF that has been supplied to the aftertreatment system 14 of the internal combustion engine system 10 over a predetermined period of time. At step 520, the controller 150 may further receive tank level data from a level sensor in a DEF tank including data indicating a first DEF level and a second DEF level. For example, a fill sensor 160 may detect a first DEF level of a storage system 30 when the engine 12 is first keyed on, and then detect a second DEF level different from the first DEF level after the engine has been operated for a period of time and DEF from the storage system 30 has been supplied to the aftertreatment system 14. Based on the tank level data, a total amount of DEF may be determined based on the change in level. At step 525, the controller 150 may, based on the dosing data, determine whether the amount of DEF supplied to the aftertreatment system exceeds an initial pre-determined threshold. For example, the controller 150 may determine, based on DEF dosing data 237, whether or not an amount of DEF supplied to the aftertreatment system 14 exceeds an initial predetermined threshold. Also as step 525, the controller 150 may determine whether an indication that a quality check is running was received. For example, based on DEF quality check data 216, the controller 150 may be able determine whether or not a DEF quality check (e.g., a VDQD) is ongoing. At step 527, upon determining that the amount of DEF supplied to the aftertreatment system does not exceed the initial pre-determined threshold or that an indication that a quality check is running was received, the controller 150 may refrain from comparing the dosing data with the tank level data and proceed to step 550. If the DEF supplied to the aftertreatment system does exceed the predetermined threshold, and/or if a DEF quality check is not running, the primary check may be enabled and the method may proceed to step 530. At step 530, the controller 150 determines whether a primary check has failed by comparing the dosing data with the tank level data by calculating a difference between the first DEF and the second DEF level and determines whether the difference is below a predetermined delta threshold. The controller 150 further determines whether the amount of DEF supplied to the aftertreatment system 14 exceeds a predetermined DEF threshold. At step 540, upon determining that the primary check is failed, the controller 150 may initiate a DEF quality check (e.g., a VDQD check) and cause a display to indicate a primary check fail. At step 550, upon determining that the primary check is failed and/or the primary check is not enabled as described above at step 527, the controller 150 may determine whether a secondary check has failed by determining whether the DEF usage amount exceeds a predetermined usage threshold. At step 560, upon determining that the secondary check is failed, the controller 150 may initiate a DEF quality check and cause to display a secondary check failed indication on a display.

In general, any process or operation discussed in this disclosure that is understood to be computer-implementable, such as the processes illustrated in FIGS. 305, may be performed by one or more processors of a computer system, such any of the systems or devices associated with internal combustion engine system 10 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices associated with internal combustion engine system 10 of FIG. 1, for example, a computing system associated with controller 150 and/or display 155. One or more processors of a computer system may be included in a single computing device or distributed among a plurality of computing devices. A memory of the computer system may include the respective memory of each computing device of the plurality of computing devices.

Figure 6:
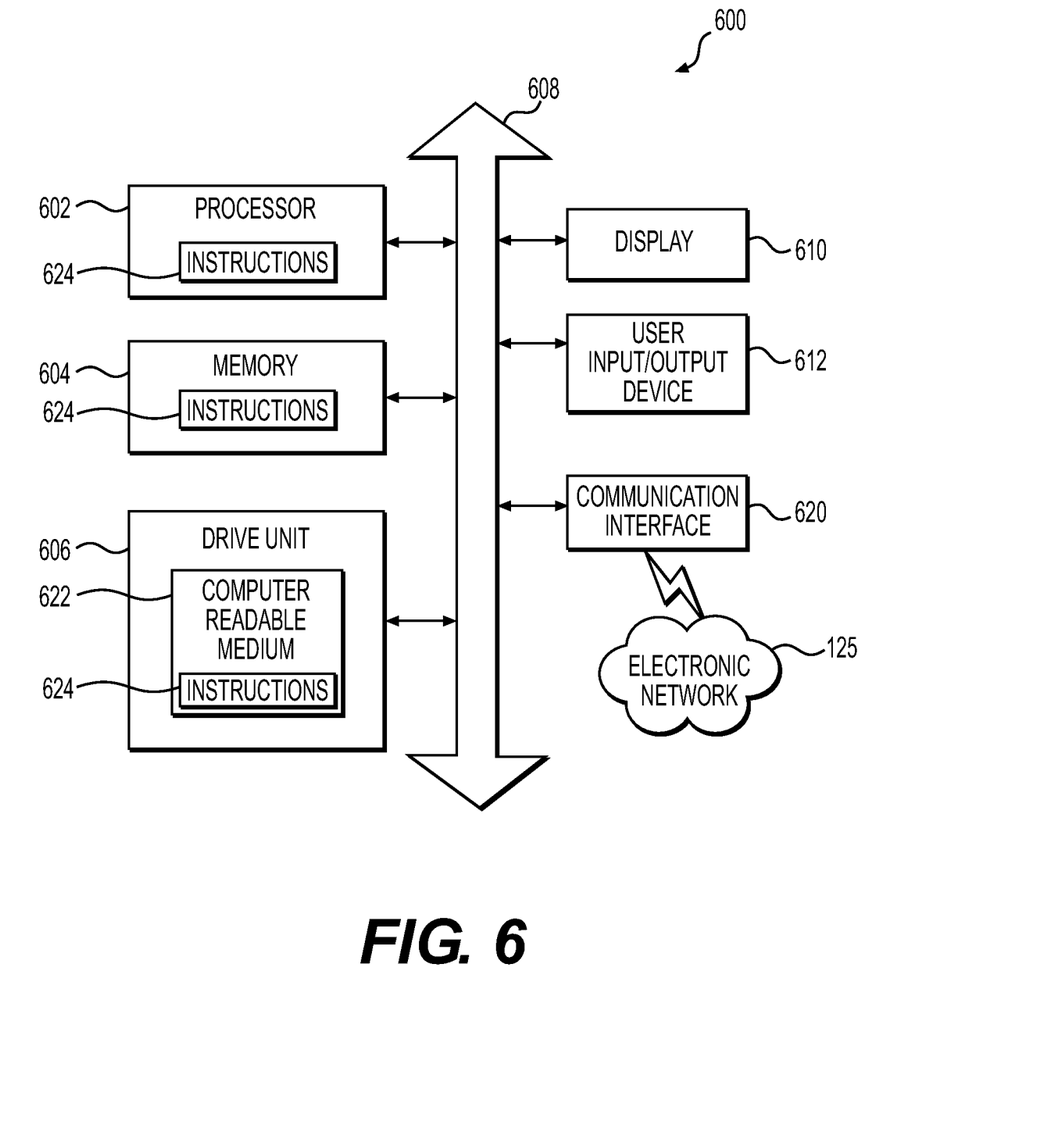
FIG. 6 is an example of a computing device, according to one or more aspects of the present disclosure.

FIG. 6 is a simplified functional block diagram of a computer 600 that may be configured as a device for executing the method of FIGS. 4-5, according to exemplary embodiments of the present disclosure. For example, the computer 600 may be configured as the controller 150 and/or another system according to exemplary embodiments of this disclosure. In various embodiments, any of the systems herein may be a computer 600 including, for example, a data communication interface 620 for packet data communication. The computer 600 also may include a central processing unit ("CPU") 602, in the form of one or more processors, for executing program instructions. The computer 600 may include an internal communication bus 608, and a storage unit 606 (such as ROM, HDD, SDD, etc.) that may store data on a computer readable medium 622, although the computer 600 may receive programming and data via network communications, for example, via network 125. The computer 600 may also have a memory 604 (such as RAM) storing instructions 624 for executing techniques presented herein, although the instructions 624 may be stored temporarily or permanently within other modules of computer 600 (e.g., processor 602 and/or computer readable medium 622). The computer 600 also may include input and output ports 612 and/or a display 610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

INDUSTRIAL APPLICABILITY

The disclosed aspects of the method for determining when to initiate a quality check of DEF and the controller 150 may be employed in a variety of machines and/or vehicles. For example, controller 150 may be included in any mobile or stationary vehicle or machine having an aftertreatment system with a fluid storage and supply system, such as a reductant storage and supply system. Controller 150 may be configured to reduce NOx emissions of any internal combustion engine by monitoring doing and tank level data and initiating a quality check.

During the operation of internal combustion engine system 10, engine 12 combusts fuel (e.g., diesel) and generates NOx-containing exhaust. Exhaust may exit engine 12 for treatment by aftertreatment system 14, in which aftertreatment devices 18, 24, 26 may reduce one or more undesired components from the exhaust. First exhaust passage 16 may provide a path for exhaust to flow from engine 12 to first aftertreatment device 18. The exhaust and reductant may travel from second exhaust passage 20 to aftertreatment devices 24 and 26, at least one of which may include an SCR catalyst that reduces NOx via a reaction involving the catalyst and reductant. Exhaust may exit aftertreatment system 14 via third exhaust passage 28.

By utilizing data obtained from one or more of pump sensor 105 and fill sensor 160, controller 150 is able to more accurately and efficiently determine sensor malfunction or tampering and initiate a quality check in response. By implementing the methods disclosed herein, drawbacks associated with relying solely on fill sensors are avoided. Further, it is possible to more accurately determine whether a fill sensor has been tampered with using the methods disclosed herein.

It will be apparent to those skilled in the art that various modifications and variations can be made to the disclosed apparatus and system without departing from the scope of the disclosure. Other embodiments of the apparatus and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A method for detecting level sensor malfunction or tampering based on reductant consumption in an aftertreatment system, the method comprising:
   receiving, at one or more processors, dosing data associated with an amount of DEF supplied to the aftertreatment system;
   receiving, by the one or more processors, tank level data from a level sensor in a DEF tank;
   comparing, by the one or more processors, the dosing data with the tank level data as part of a primary check; and
   based on the comparison:
      initiating, by the one or more processors, a quality check, wherein the quality check is performed with one or more NOx sensors; and
      causing, by the one or more processors, a presentation of an indication that the quality check is being initiated.

2. The method of claim 1, further comprising:
   receiving, by the one or more processors, sensor status data from the level sensor, wherein the sensor status data includes data indicating that the level sensor in the DEF tank has mechanically or electrically failed.

3. The method of claim 2, further comprising:
   upon receiving the sensor status data from the level sensor, determining, by the one or more processors, whether the amount of DEF supplied to the aftertreatment system exceeds a pre-determined threshold; and
   upon determining that the amount of DEF supplied to the aftertreatment system exceeds the pre-determined threshold, initiating, by the one or more processors, the quality check.

4. The method of claim 1, further comprising:
   receiving, by the one or more processors, an indication that the quality check is running; and
   upon receiving an indication that the quality check is running, refraining from comparing, by the one or more processors, the dosing data with the tank level data.

5. The method of claim 1, further comprising:
   determining, by the one or more processors, whether the amount of DEF supplied to the aftertreatment system exceeds an initial pre-determined threshold; and
   upon that the amount of DEF supplied to the aftertreatment system does not exceed the initial pre-determined threshold, refraining from comparing, by the one or more processors, the dosing data with the tank level data.

6. The method of claim 1, wherein:
   the tank level data includes a first DEF level and a second DEF level; and
   comparing the dosing data with the tank level data further comprises:
      calculating a difference between the first DEF level and the second DEF level and determining whether the difference is below a predetermined delta threshold; and
      determining whether the amount of DEF supplied to the aftertreatment system exceeds a pre-determined DEF threshold.

7. The method of claim 1, wherein the quality check is a virtual DEF quality detection check.

8. A system for determining when to initiate a quality check of DEF used in an aftertreatment system, the system comprising:
   a memory storing instructions; and
   a processor executing the instructions to perform a process including:
      receiving dosing data associated with an amount of DEF supplied to the aftertreatment system;
      receiving tank level data from a level sensor in a DEF tank;
      comparing the dosing data with the tank level data;
      based on the comparison:
         initiating a quality check; and
         causing a presentation of an indication that the quality check is being initiated on a display;
      receiving an indication the quality check is running; and
      upon receiving an indication that the quality check is running, refraining from comparing the dosing data with the tank level data.

9. The system of claim 8, the process further comprising receiving sensor status data from the level sensor, wherein the sensor status data includes data indicating that the level sensor in the DEF tank has mechanically or electrically failed.

10. The system of claim 9, the process further comprising:
    upon receiving the sensor status data from the level sensor, determining whether the amount of DEF supplied to the aftertreatment system exceeds a pre-determined threshold; and
    upon determining that the amount of DEF supplied to the aftertreatment system exceeds the pre-determined threshold, initiating an additional quality check.

11. The system of claim 8, the process further comprising:
    determining whether the amount of DEF supplied to the aftertreatment system exceeds an initial pre-determined threshold; and
    upon that the amount of DEF supplied to the aftertreatment system does not exceed the initial pre-determined threshold, refraining from comparing the dosing data with the tank level data.

12. The system of claim 8, wherein:
    the tank level data includes a first DEF level and a second DEF level; and
    comparing the dosing data with the tank level data further comprises:

calculating a difference between the first DEF level and the second DEF level and determining whether the difference is below a predetermined delta threshold; and determining whether the amount of DEF supplied to the aftertreatment system exceeds a pre-determined DEF threshold.

13. The system of claim 8, wherein the quality check is a virtual DEF quality detection check.

14. A non-transitory computer-readable medium storing instructions that, when executed by a processor, cause the processor to perform a method for detecting level sensor malfunction or tampering based on reductant consumption in an aftertreatment system, the method comprising:

receiving dosing data associated with an amount of DEF supplied to the aftertreatment system;

receiving tank level data from a level sensor in a DEF tank;

determining whether the amount of DEF supplied to the aftertreatment system exceeds an initial pre-determined threshold;

upon determining that the amount of DEF supplied to the aftertreatment system does not exceed the initial pre-determined threshold, refraining from comparing the dosing data with the tank level data;

comparing the dosing data with the tank level data; and based on the comparison:

initiating a virtual DEF quality detection check; and causing to present an indication that the virtual DEF quality detection check is being initiated on a display.

15. The non-transitory computer-readable medium of claim 14, the method further comprising receiving sensor status data from the level sensor, wherein the sensor status data includes data indicating that the level sensor in the DEF tank has mechanically or electrically failed.

16. The non-transitory computer-readable medium of claim 15, wherein the virtual DEF quality detection check is initiated upon determining that the amount of DEF supplied to the aftertreatment system exceeds the initial pre-determined threshold.

17. The non-transitory computer-readable medium of claim 14, the method further comprising:

receiving an indication that the virtual DEF quality detection check is running; and upon receiving an indication that the virtual DEF quality detection check is running, refraining from comparing the dosing data with the tank level data.

18. The non-transitory computer-readable medium of claim 14, wherein:

the tank level data includes a first DEF level and a second DEF level; and comparing the dosing data with the tank level data further comprises:

calculating a difference between the first DEF level and the second DEF level and determining whether the difference is below a predetermined delta threshold; and determining whether the amount of DEF supplied to the aftertreatment system exceeds a pre-determined DEF threshold.

19. A method for detecting level sensor malfunction or tampering based on reductant consumption in an aftertreatment system, the method comprising:

receiving, at one or more processors, dosing data associated with an amount of DEF supplied to the aftertreatment system;

receiving, by the one or more processors, tank level data from a level sensor in a DEF tank;

comparing, by the one or more processors, the dosing data with the tank level data as part of a primary check; and based on the comparison:

initiating, by the one or more processors, a quality check; and causing, by the one or more processors, a presentation of an indication that the quality check is being initiated; and wherein upon identifying a failure of the primary check, causing a presentation of an indication that the primary check has failed.

* * * * *